United States Patent
Seo et al.

(10) Patent No.: US 9,895,992 B2
(45) Date of Patent: *Feb. 20, 2018

(54) PROVIDING BATTERY CHARGE STATE INFORMATION OF ELECTRIC VEHICLE

(71) Applicant: KT CORPORATION, Gyeonggi-do (KR)

(72) Inventors: Dong-Seob Seo, Sejong-si (KR); Jung-Guen Kim, Daejeon (KR); Myung-Woo Seo, Daejeon (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/945,533

(22) Filed: Nov. 19, 2015

(65) Prior Publication Data

US 2016/0068076 A1    Mar. 10, 2016

Related U.S. Application Data

(63) Continuation of application No. 14/162,265, filed on Jan. 23, 2014, now Pat. No. 9,216,659.

(30) Foreign Application Priority Data

Jan. 30, 2013    (KR) .......................... 10-2013-0010338

(51) Int. Cl.
  *G05D 3/00*   (2006.01)
  *B60L 11/18*  (2006.01)
  (Continued)

(52) U.S. Cl.
CPC .......... *B60L 11/1861* (2013.01); *B60L 1/003* (2013.01); *B60L 1/02* (2013.01); *B60L 1/14* (2013.01); *B60L 11/1862* (2013.01); *B60L 11/1868* (2013.01); *B60R 25/1018* (2013.01); *B60L 2200/12* (2013.01); *B60L 2240/34* (2013.01); *B60L 2240/80* (2013.01); *B60L 2250/10* (2013.01); *B60L 2250/16* (2013.01); *B60L 2250/20* (2013.01); *Y02T 10/7005* (2013.01);

(Continued)

(58) Field of Classification Search
CPC ............................. B60L 11/1861; B60L 1/003
See application file for complete search history.

(56) References Cited

U.S. PATENT DOCUMENTS 5,521,443 A    5/1996  Imura et al.
6,549,130 B1 *  4/2003  Joao .......................... 340/539.14
(Continued)

FOREIGN PATENT DOCUMENTS

JP    07-087607 A    3/1995
JP    07-111702 A    4/1995
(Continued)

*Primary Examiner* — Adam Alharbi
(74) *Attorney, Agent, or Firm* — IP Legal Services, LLC

(57) ABSTRACT

The disclosure is related to providing information on a battery charge state of a parked electric vehicle through at least one of one or more light lamps and one or more speakers of the parked electric vehicle. Particularly, the disclosure may control at least one of a lamp light color, a lamp blink pattern, and a sound pattern according to the battery charge state information such that a user can recognize the battery charge state away from the electric vehicle through hearing and/or vision.

20 Claims, 9 Drawing Sheets

(51) Int. Cl.
 *B60L 1/00* (2006.01)
 *B60L 1/02* (2006.01)
 *B60L 1/14* (2006.01)
 *B60R 25/10* (2013.01)

(52) U.S. Cl.
 CPC ........ *Y02T 10/7044* (2013.01); *Y02T 10/7066* (2013.01); *Y02T 90/168* (2013.01); *Y04S 30/12* (2013.01)

(56) References Cited

U.S. PATENT DOCUMENTS

2010/0072290 A1\* 3/2010 Dage ............................. 236/51
2010/0230193 A1 9/2010 Grider et al.

FOREIGN PATENT DOCUMENTS

| | | |
|---|---|---|
| JP | 10-126901 A | 5/1998 |
| JP | 11-023681 A | 1/1999 |
| JP | 2008-011586 A | 1/2008 |
| JP | 2010-127166 A | 6/2010 |
| KR | 10-0144043 B1 | 10/1998 |
| KR | 10-1999-0053660 A | 7/1999 |
| KR | 10-2011-0000011 A | 1/2011 |
| KR | 10-1011624 B1 | 1/2011 |
| KR | 10-2011-0052773 A | 5/2011 |
| KR | 10-2012-0031610 A | 4/2012 |
| KR | 10-2012-0094303 A | 8/2012 |

\* cited by examiner

| Remaining Battery Power Amount | Battery Charge State Level | Control Signals for Lamps |
|---|---|---|
| 80~100% | 1 |  |
| 50~80% | 2 |  |
| 20~50% | 3 |  |
| 0~20% | 4 |  |

FIG. 7

| Remaining Battery Power Amount | Battery Charge State Level | Control Signals for Speakers |
|---|---|---|
| 80~100% | 1 | |
| 50~80% | 2 | |
| 20~50% | 3 | |
| 0~20% | 4 | |

PROVIDING BATTERY CHARGE STATE INFORMATION OF ELECTRIC VEHICLE

CROSS REFERENCE TO PRIOR APPLICATIONS

The present application is continuation application of U.S. patent application Ser. No. 14/162,265 (filed on Jan. 23, 2014), which claims priority under 35 U.S.C. § 119 to Korean Patent Application No. 10-2013-0010338 (filed on Jan. 30, 2013).

TECHNICAL FIELD

The present disclosure relates to managing an electric vehicle, in particular, to providing information on a battery charge state of a parked electric vehicle through at least one of one or more light lamps and one or more speakers of the parked electric vehicle.

BACKGROUND

An electric vehicle moves by rotating its motor using electricity stored in a battery. Such electric vehicle was developed before of the development of a typical vehicle using an internal combustion engine. However, practical limitations of the electrical vehicle caused by the weight and the time required to charge its battery hindered the full commercialization of the electric vehicle. But, the environmental concerns of using the internal combustion engine have revitalized a further development of the electric vehicle.

The electric vehicle is similar to other typical vehicles with internal combustions engines except that it has an electric motor instead of a combustion engine. Unlike a typical vehicle, an important issue of the electric vehicle development is to reduce the size and the weight of the battery corresponding to its energy source. Particularly, reducing the time required to charge the battery is a critical element for the full commercialization of the electric vehicle.

Accordingly, in a case of an electric vehicle, battery management (i.e., an electric charging management) is very important in operating the electric vehicle. In practice, users may not be able to operate an electric vehicle or may have to wait for a long time if the battery management is not properly performed.

Typically, users check a remaining battery power amount through a battery gauge of an electric vehicle. Such typical way has a limitation. For example, users are not able to check a remaining battery power amount when the electric vehicle (particularly, an electric motor of the electric vehicle) is off, or when the users are outside of the electric vehicle.

The development of telematics technology allowed users to control an electric vehicle or check the status of the electric vehicle through external devices. For example, users may check the status of the battery or the remaining power amount of the battery through wireless devices (e.g., a smart phone). However, such scheme using the telematics technology may require the electric vehicle to have an additional device to communicate with the wireless devices of the users, and this may cost more to users. Furthermore, when users do not carry or have such wireless devices, users may be no longer able to check the status or the remaining power amount of the battery.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, information on a battery charge state of a parked electric vehicle (particularly, a parked electric vehicle being in a power-off state) may be provided (or expressed) through at least one of one or more light lamps and one or more speakers of the electric vehicle, by controlling at least one of a lamp color division, a lamp blink pattern, and a sound pattern.

In accordance with at least one embodiment, a method may be provided for providing battery charge state information of a parked electric vehicle. The method may include receiving an external control signal for the electric vehicle, determining a battery charge state of the electric vehicle, and providing the battery charge state information by controlling at least one of (i) one or more light lamps and (ii) one or more speakers of the electric vehicle according to the battery charge state.

The determining may include obtaining information on a remaining battery power amount of the electric vehicle, and determining a battery charge state level based on the remaining battery power amount.

The obtaining may be performed at least one of upon receipt of the external control signal is received, and at a predetermined regular interval.

The providing the battery charge state information may include providing the battery charge state information by controlling at least one of a lamp light color, a lamp blink pattern, and a sound pattern according to the battery charge state level.

The method may further include transmitting information on the battery charge state level to a corresponding remote control device.

The one or more light lamps may be installed on at least one of an interior and exterior of the electric vehicle.

The one or more speaker may include at least one of a horn speaker and an anti-theft alarm speaker.

The electric vehicle may be in a power-off state.

The method may further include determining whether a warning condition is satisfied, wherein the warning condition includes at least one of (i) whether the remaining battery power amount is less than a first threshold value, and (ii) whether a decreasing rate of the remaining battery power amount exceeds a second threshold value, and providing warning information by controlling at least one of a lamp light color, a lamp blink pattern, and a sound pattern when the warning condition is satisfied.

The providing the warning information may include monitoring whether a remote control device is within a predetermined distance from the electric vehicle when the warning condition is satisfied, and providing the warning information by controlling the at least one of the lamp light color, the lamp blink pattern, and the sound pattern when the remote control device is within the predetermined distance.

The method may further include transmitting a warning notification to a corresponding remote control device.

The external control signal may be at least one of a door control signal, a battery check signal, a trunk control signal, a start control signal, and a vehicle location check signal.

The external control signal may be generated by a remote control device.

The remote control device is one of a wireless key device and user equipment having a remote control function for the electric vehicle.

In accordance with other embodiments, an apparatus may be provided for providing battery charge state information of a parked electric vehicle. The apparatus may include a battery power measurement processor and a battery charge information providing processor. The battery power measurement processor may be configured to measure a remaining battery power amount of the electric vehicle. The battery charge information providing processor may be configured (i) to determine at least one of a battery charge state level and a satisfaction of a warning condition, based on the remaining battery power amount, and (ii) to provide the battery charge state information by controlling at least one of one or more light lamps and one or more speakers of the electric vehicle according to a determination result.

The battery charge information providing processor may be configured to provide the battery charge state information by controlling at least one of a lamp light color, a lamp blink pattern, and a sound pattern according to the determination result.

The warning condition may include at least one of whether the remaining battery power amount is less than a first threshold value, and whether a decreasing rate of the remaining battery power amount exceeds a second threshold value.

In a case that the electric vehicle being in a power-off state includes a main battery and an auxiliary battery, the battery charge information providing processor may be configured to perform a power connection between the battery power measurement processor and the auxiliary battery, request the battery power measurement processor to measure the remaining battery power amount of the main battery, receive information on the remaining battery power amount from the battery power measurement processor, and disconnect the power connection when the remaining battery power amount information is received.

The battery charge information providing processor may be configured to request the battery power measurement processor to measure the remaining battery power amount at least one of (i) upon receipt of an external control signal from a corresponding remote control device, and (ii) at a predetermined regular interval. Herein, in a case that the remaining battery power amount is periodically measured, the battery charge information providing processor may be configured to determine the at least one of the battery charge state level and the satisfaction of the warning condition and to provide the battery charge state information, when an external control signal is received from the corresponding remote control device.

In accordance with still other embodiments, a wireless key device may be provided for providing battery charge state information of a parked electric vehicle. The wireless key device may include an output unit including at least one of one or more light lamps and one or more speakers, a communication processor configured to transmit an external control signal to the electric vehicle, and to receive at least one of battery charge state level information and warning information associated with a battery of the electric vehicle from a battery charge state providing apparatus, and a control processor configured to control at least one of (i) a lamp light color, (ii) a lamp blink pattern, and (iii) a sound pattern associated with the output unit, according to the at least one of the battery charge state level information and the warning information.

BRIEF DESCRIPTION OF THE DRAWINGS

The above and/or other aspects of some embodiments of the present invention will become apparent and more readily appreciated from the following description of embodiments, taken in conjunction with the accompanying drawings, of which:

FIG. 7 illustrates speaker control signals determined based on a remaining battery power amount in accordance with at least one embodiment;

DETAILED DESCRIPTION OF EMBODIMENTS

Figure 1:
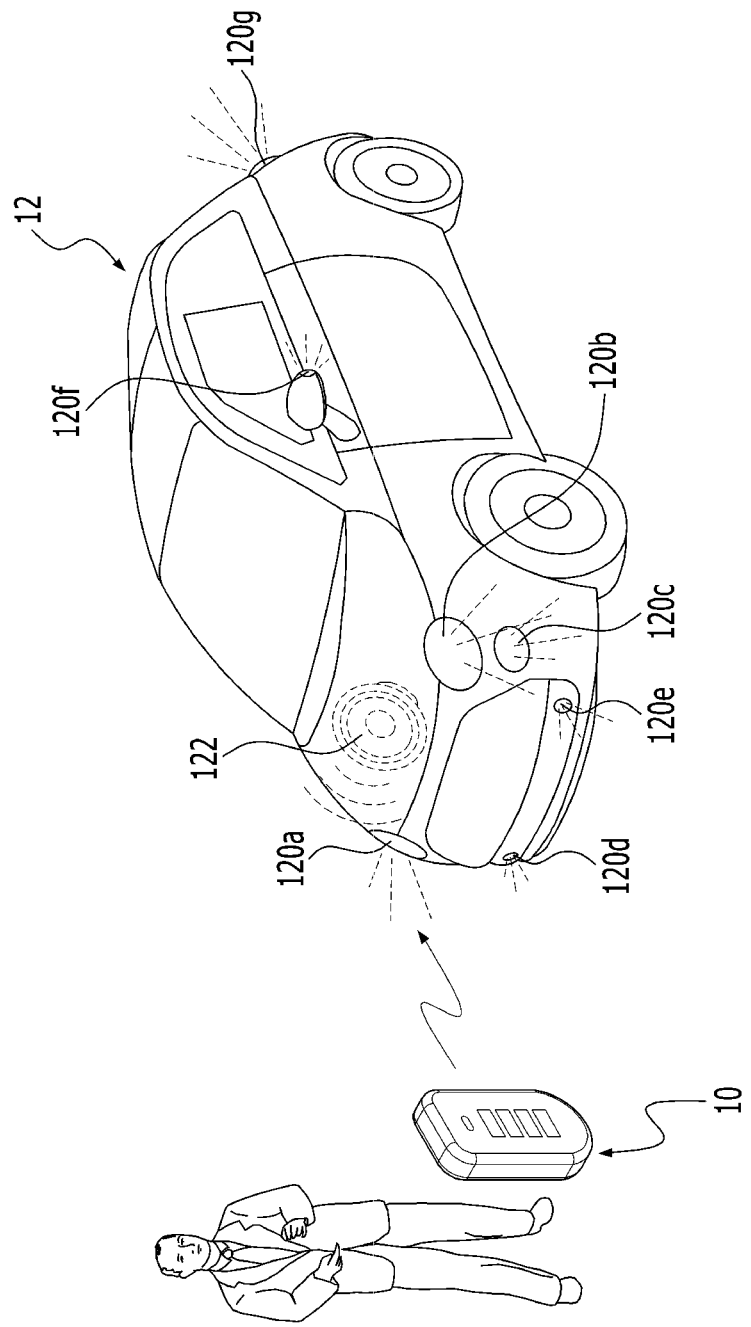
FIG. 1 illustrates interworking for providing battery charge state information of an electric vehicle in accordance with at least one embodiment.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

The present embodiment may provide information on a battery charge state of a parked electric vehicle (particularly, a parked electric vehicle being in a power-off state) through at least one of one or more light lamps and one or more speakers of the electric vehicle. Particularly, the present embodiment may control at least one of a lamp light color, a lamp blink pattern, and a sound pattern according to the battery charge state information such that an electric vehicle user can recognize the battery charge state away from the electric vehicle through hearing and/or vision.

FIG. 1 illustrates interworking for providing battery charge state information of an electric vehicle in accordance with at least one embodiment.

As shown in FIG. 1, a battery charge state providing apparatus (e.g., 20) according to the present embodiment may provide information on a battery charge state (e.g., a remaining battery power amount) of a parked electric vehicle (e.g., 12). More specifically, when receiving a remote control signal transmitted by a wireless key device (e.g., 10), the battery charge state providing apparatus (e.g., 20) may provide battery charge state information by controlling at least one of a lamp light color, a lamp blink pattern, and a sound pattern according to the battery charge state level. Accordingly, a user of a parked electric vehicle may recognize a remaining battery power amount away from the electric vehicle through hearing and vision. Herein, the parked electric vehicle (e.g., 12) may be in a power-off state (i.e., an operation-off state). In another embodiment, even in the case that an electric motor of a parked electric vehicle remotely starts by an external control signal (e.g., a start control signal) transmitted from wireless key device 10, at least one embodiment described later (i.e., at least one embodiment described later with reference to FIG. 1 through FIG. 9) may be applied.

Wireless key device 10 may remotely control operations of an electric vehicle (e.g., 12). More specifically, wireless key device 10 may transmit a remote control signal associated with the operations of an electric vehicle (e.g., 12). Such operation of the electric vehicle (e.g., 12) may include door locking/unlocking operations, trunk opening (unlocking)/closing operations, power on/off operations, a car search operation, a battery check operation, and so forth. Accordingly, wireless key device 10 may have a plurality of function buttons associated with the operations. For example, wireless key device 10 may have at least one of a door locking button, a door unlocking button, a trunk opening button, a trunk closing button, a power on/off button, a car search button, and a battery check button. Wireless key device 10 may include a smart key. Furthermore, wireless key device 10 may receive electric vehicle information from the electric vehicle (e.g., 12). Herein, the electric vehicle information may include information on an electric vehicle state, a battery state (e.g. a remaining battery power, etc.), and/or an electric vehicle location. In other embodiments, user equipment (e.g., a wireless terminal, a smart phone, etc.) may perform the above-described operations of wireless key device 10. Accordingly, the term "remote control device" may be used as a general concept that includes a variety of devices (e.g., a wireless key device, user equipment, etc.) capable of remotely operating an electric vehicle.

An electric vehicle (e.g., 12) may include one or more light lamps (e.g., 120a through 120g), and/or one or more speakers (e.g., 122). The one or more light lamps (e.g., 120a through 120g), and/or one or more speakers (e.g., 122) may be employed for providing information on a remaining battery power.

Herein, the one or more light lamps (e.g., 120a through 120g) may be installed at the interior and/or exterior of the electric vehicle (e.g., 12). For example, the one or more light lamps (e.g., 120a through 120g) may include one or more head light lamps, one or more fog lamps, one or more blinker lamps, one or more tail light lamps (e.g., break lamps), one or more room lamps, and so forth. In other embodiments, the one or more light lamps may further include one or more additional lamps for providing information on a remaining battery power. The one or more light lamps may be lamps of various types. For example, the one or more light lamps may include light bulb lamps, light-emitting diode (LED) lamps, organic light emitting diode (OLED) lamps, and so forth.

Meanwhile, the one or more speakers may be one or more speakers installed in the electric vehicle (e.g., 12). For example, the one or more speakers (e.g., 122) may include a horn speaker, an anti-theft alarm speaker, and so forth. In other embodiments, the one or more speakers may further include one or more additional speakers for providing information on a remaining battery power.

Electric vehicles (EVs) may include electric cars (e.g., 12), electric motorcycles, and/or electric motorbikes, but are not limited thereto.

Figure 2:
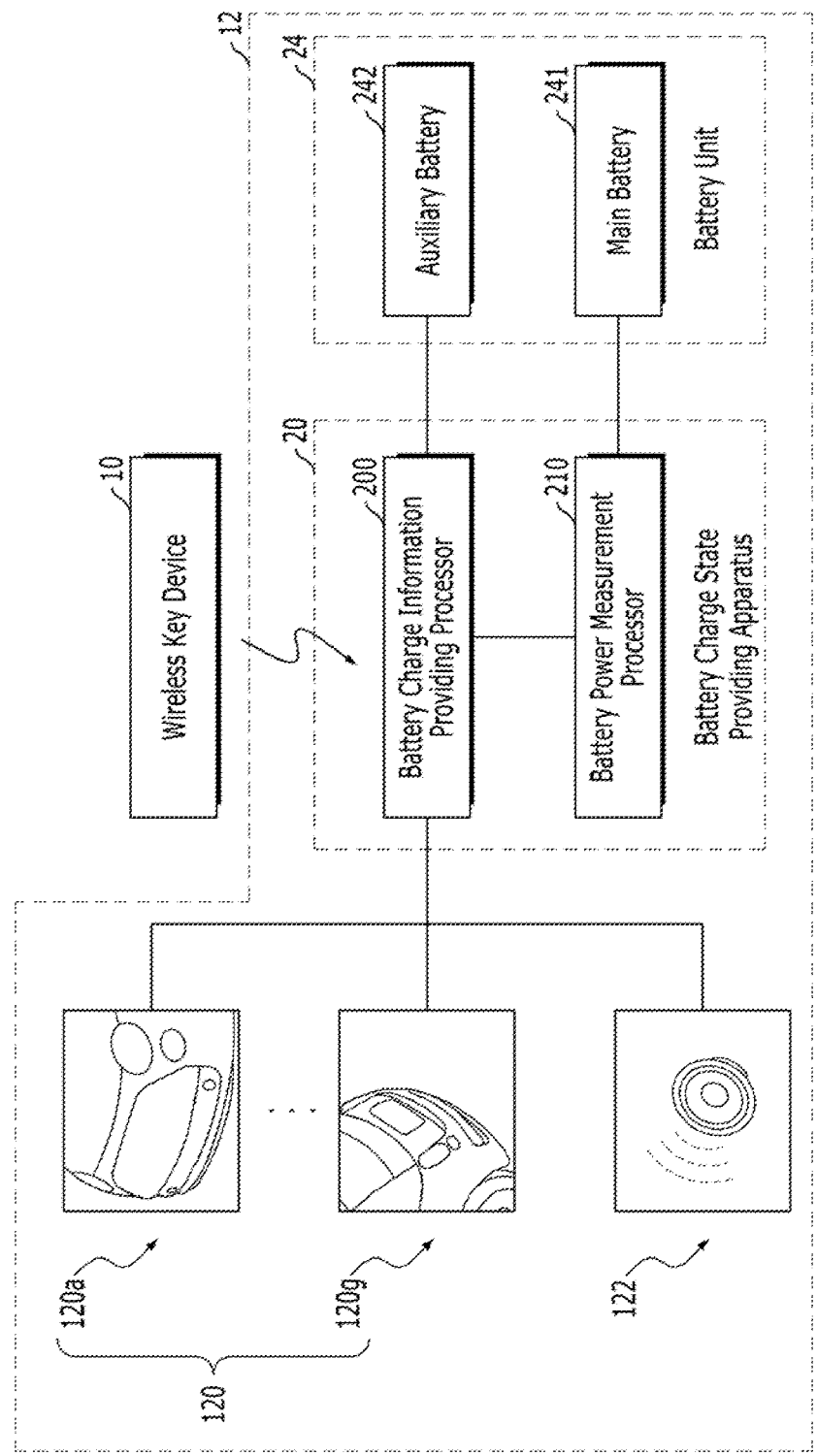
FIG. 2 is a block diagram illustrating a battery charge state providing apparatus in accordance with at least one embodiment.

FIG. 2 is a block diagram illustrating a battery charge state providing apparatus in accordance with at least one embodiment.

A user may control an operation (e.g., a door locking/unlocking) of electric vehicle 12 using wireless key device 10. For example, when a user presses a unlock button of wireless key device 10, wireless key device 10 may transmit a remote control signal corresponding to the unlock button to a corresponding electric vehicle (e.g., 12). When receiving a remote control signal (i.e., an external control signal) from wireless key device 10, battery charge state providing apparatus 20 of electric vehicle 12 may provide visual or audible information on a remaining battery power amount. More specifically, in this case, battery charge state providing apparatus 20 may express a current battery charge state by controlling at least one of (i) light colors of one or more light lamps (e.g., 120), (ii) a lamp blink pattern of the one or more light lamps (e.g., 120), and (iii) a sound pattern of one or more speakers (e.g., 122), according to a battery charge state level (e.g., a remaining battery power amount).

As shown in FIG. 2, battery charge state providing apparatus 12 may include battery charge information providing processor 200 and battery power measurement processor 210.

Battery charge information providing processor 200 may provide battery charge state information, by controlling at least one of one or more light lamps and one or more speakers of an electric vehicle according to a battery charge state (e.g., a battery charge state level) of the electric vehicle. Furthermore, battery charge information providing processor 200 may transmit battery charge state level information and/or warning information to wireless key device 10 and/or user equipment. Hereinafter, battery charge state information may be used as a concept including the battery charge state level information and the warning information. In this case, battery charge information providing processor 200 may use an electric control unit (ECU) which manages and controls operations of an electric vehicle such as a driving operation, a breaking operations, and a wheel steering operation. Alternatively, the ECU may be included in battery charge information providing processor 200. Battery charge information providing processor 200 will be described in more detail with reference to FIG. 3.

Meanwhile, battery power measurement processor 210 may measure a battery charge state of a corresponding electric vehicle (e.g., 12). In this case, battery power measurement processor 210 may use a battery management system (BMS) which manages a battery of an electric vehicle. Alternatively, the BMS may be included in battery power measurement processor 210.

Battery unit 24 of an electric vehicle (e.g., 12) may include one battery capable of supplying an electric power required to operate the electric vehicle. Alternatively, battery unit 24 may include two or more batteries. For example, an electric car (e.g., 12) may include main battery 241 (or may be simply referred to as "battery") and auxiliary battery 242. Herein, main battery 241 may be employed for driving an electric motor of an electric vehicle. Auxiliary battery 242 may be employed for operating a heating, ventilating, and an air conditioning (HVAC) apparatus and/or an electronic apparatus (e.g., battery charge information providing processor 200, battery power measurement processor 210, light lamps, speakers, etc.) installed in the electric vehicle. More specifically, if an electric vehicle is parked and in a power-off state, an electric power of main battery 241 may not be supplied to the electric vehicle. In this case, auxiliary battery 242 may supply an electric power to one or more constituent elements (e.g., an HVAC apparatus, battery charge information providing processor 200, battery power measurement processor 210, light lamps, speakers, etc.). In the case that an electric vehicle has an auxiliary battery (e.g., 242), an electric control unit (ECU) may receive an electric power from the auxiliary battery (e.g., 242) although the electric vehicle is in a power-off state (i.e., an operation-off state).

Furthermore, battery charge information providing processor 200 may also receive an electric power from the auxiliary battery (e.g., 242) although the electric vehicle is in a power-off state (i.e., an operation-off state). In at least one embodiment, the electric control unit (ECU) may be included in battery charge information providing processor 200.

Figure 3:
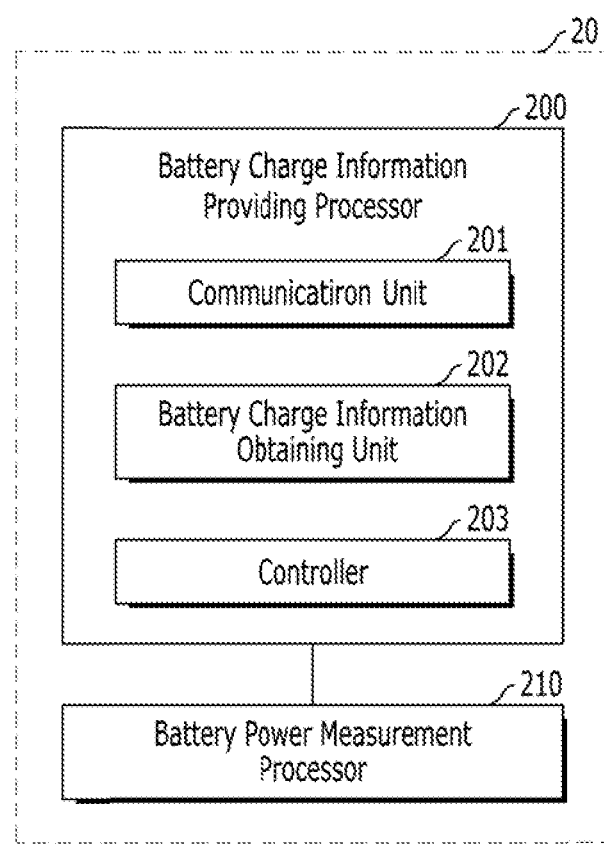
FIG. 3 is a block diagram illustrating a detailed structure of a battery charge information providing processor in accordance with at least one embodiment.

FIG. 3 is a block diagram illustrating a detailed structure of a battery charge information providing processor in accordance with at least one embodiment.

As shown in FIG. 3, battery charge state providing apparatus 20 may include battery charge information providing processor 200 and battery power measurement processor 210. More specifically, battery charge information providing processor 200 may include communication unit 201, battery charge information obtaining unit 202, and controller 203. Operations of batter charge state providing apparatus 20 (particularly, battery charge information providing processor 200) will be described in more detail with reference to FIG. 4 through FIG. 8.

Communication unit 201 corresponding to a sub-processor may receive an external control signal (or may be referred to as "a remote control signal") for controlling operations of electric vehicle 12 from a remote control device (e.g., wireless key device 10, user equipment). Furthermore, communication unit 201 may transmit battery charge state level information and/or warning information (e.g., a warning notification message) to wireless key device 10 and/or user equipment. Herein, the external control signal, the battery charge state level information and/or the warning information may be transmitted/received through a wireless communication scheme. The wireless communication scheme may include a local area wireless communication scheme, a Bluetooth communication scheme, and/or an infrared light communication scheme, but is not limited thereto.

Battery charge information obtaining unit 202 corresponding to a sub-processor may obtain remaining battery power information from battery power measurement processor 210. More specifically, battery charge information obtaining unit 202 may obtain the remaining battery power information (i) at a predetermined regular interval (i.e., periodically) or (ii) whenever an external control signal is received from wireless key device 10. In other words, battery charge information obtaining unit 202 may request battery power measurement processor 210 to measure a remaining battery power amount of a corresponding battery (e.g., main battery 241) (i) at a predetermined regular interval (i.e., periodically) or (ii) whenever an external control signal is received from wireless key device 10. In this case, battery power measurement processor 210 may measure the remaining battery power amount of the corresponding battery (e.g., main battery 241), and provide information on the measured remaining battery power amount to battery charge information obtaining unit 202. When receiving the remaining battery power amount information from battery power measurement processor 210, battery charge information obtaining unit 202 may store and manage the received remaining battery power amount information. In the case that an electric motor of an electric vehicle (e.g., 12) is off (i.e., electric vehicle 12 is in a power-off state), battery power measurement processor 210 may be disconnected from a battery (e.g., main battery 241). In this case, battery power measurement processor 210 may not receive electric power from the battery (e.g., main battery 241). Accordingly, battery charge information obtaining unit 202 may perform a power connection between battery power measurement processor 210 and another battery (e.g., auxiliary battery 242) such that another battery (e.g., auxiliary battery 242) provides electric power to battery power measurement processor 210. In this case, battery charge information obtaining unit 202 may be required to perform the power connection before or when sending a battery power measurement request to battery power measurement processor 210. When receiving the remaining battery power amount information from battery power measurement processor 210, battery charge information obtaining unit 202 may disconnect the power connection between battery power measurement processor 210 and another battery (e.g., auxiliary battery 242).

In addition, battery charge information obtaining unit 202 may determine a battery charge state level (e.g., "Level 1") corresponding to a remaining battery power amount by comparing the remaining battery power amount to a plurality of battery charge state levels. Herein, the plurality of battery charge state levels will be described in more detail with reference to FIG. 5 and FIG. 7. Furthermore, battery charge information obtaining unit 202 may determine whether a warning condition is satisfied, based on remaining battery power information. Herein, the warning condition may be at least one of (i) whether the remaining battery power amount is less than a predetermined minimum value (or may be referred to as "a first threshold value"), or (ii) whether a decreasing rate of the remaining battery power amount exceeds a predetermined difference value (or may be referred to as "second threshold value").

Controller 203 corresponding to a sub-processor may control speaker outputs (i.e., sound outputs of one or more speakers) and/or lamp outputs (i.e., light outputs of one or more lamps) of a corresponding electric vehicle (e.g., 12), according to a battery charge state level and/or a satisfaction of the warning condition determined by battery charge information obtaining unit 202. More specifically, controller 203 may have control information (i.e., lamp/speaker control information) corresponding to each battery charge state level (see FIG. 5 and FIG. 7) and/or a warning state. Herein, the control information may include control information associated with at least one of a lamp light color, a lamp blink pattern, and a sound pattern. Accordingly, controller 203 may create at least one control signal (may be referred to as "battery charge state indication signal") corresponding to the battery charge state level (e.g., level 2 in FIG. 5 and FIG. 7) and/or a satisfaction of the warning condition, and transmit the at least control signals to one or more light lamps 120 and/or one or more speakers 122. Controller 203 may control at least one of a lamp light color, a lamp blink pattern, and a sound pattern using the created control signal (s). For example, in the case that a remaining battery power amount corresponds to level 2 in FIG. 5 and FIG. 7, controller 203 may (i) control one or more light lamps of a corresponding electric vehicle according to a control signal (may be referred to as "a battery charge state indication signal") shown in FIG. 5, and/or (ii) control one or more speakers according to a control signal shown in FIG. 7.

Particularly, when the warning condition is satisfied, controller 203 may create warning information (e.g., lamp/speaker control information, or a warning notification message). Controller 203 may control one or more light lamps and/or one or more speakers according to the lamp/speaker control information. Herein, the lamp/speaker control information may be control signals corresponding to one (e.g., Level 4) of a plurality of levels shown in FIG. 5 and FIG. 7. Alternatively, the lamp/speaker control information may be control signals different from control signals shown in FIG. 5 and/or FIG. 7. In at least one embodiment, when the warning condition is satisfied, controller 203 may control one or more light lamps and/or one or more speakers of electric vehicle 12, regardless of reception of an external control signal. Alternatively, although an external control signal is not received, controller 203 may control one or more light lamps and/or one or more speakers of electric vehicle 12 when an electric vehicle user having wireless key device 10 comes to within a predetermined distance from electric vehicle 12. When the warning condition is satisfied, controller 203 may periodically (e.g., periodically within a predetermined time limit or within a predetermined number of times) control one or more light lamps and/or one or more speakers of electric vehicle 12. In other embodiments, controller 203 may control communication unit 201 to transmit battery charge state level information and/or warning information (e.g., a warning notification message) to wireless key device 10 and/or user equipment.

Figure 4:
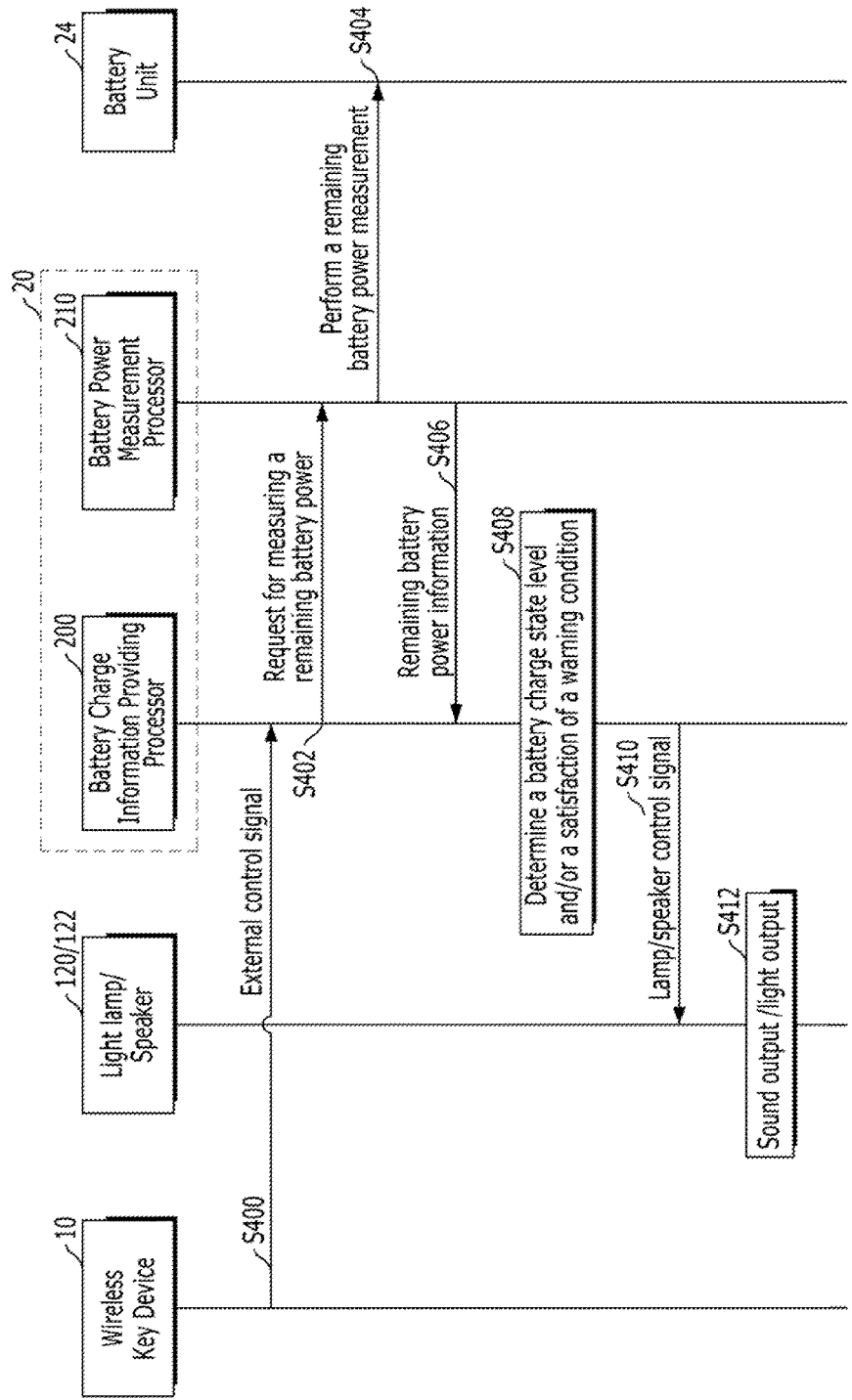
FIG. 4 illustrates a method of providing battery charge state information of an electric vehicle in the case that a measurement procedure of a remaining battery power is performed according to a reception of an external control signal, in accordance with at least one embodiment.

FIG. 4 illustrates a method of providing battery charge state information of an electric vehicle in the case that a measurement procedure of a remaining battery power is performed according to a reception of an external control signal, in accordance with at least one embodiment. That is, FIG. 4 illustrates a method of providing battery charge state information whenever an external control signal is received from a corresponding wireless key device (e.g., 10).

Referring to FIG. 4, at step S400, an electric vehicle user may remotely transmit an external control signal (may be referred to as "a remote control signal") to a parked electric vehicle (e.g., electric vehicle 12), using wireless key device 10 (e.g., a smart key, etc.). Herein, the parked electric vehicle may be in a power-off state (i.e., an operation-off state). In other embodiments, even in the case that an electric motor of a parked electric vehicle remotely starts by an external control signal (e.g., a start control signal) transmitted from wireless key device 10, a method of providing battery charge state information of an electric vehicle may be applied.

At step S402, when receiving the external control signal from wireless key device 10, battery charge information providing processor 200 of the electric vehicle may request battery power measurement processor 210 to measure a remaining battery power amount of the electric vehicle.

At step S404, when receiving a request for measuring the remaining battery power amount, battery power measurement processor 210 may measure the remaining battery power amount of battery unit 24. In the case that battery unit 24 includes main battery 241 and auxiliary battery 242, battery power measurement processor 210 may measure the remaining battery power amount of main battery 241.

At step S406, battery power measurement processor 210 may send remaining battery power information (i.e., information of a remaining battery power amount) to battery charge information providing processor 200. For example, in the case that an electric motor of an electric vehicle (e.g., 12) is off, battery power measurement processor 210 may be disconnected from a battery (e.g., main battery 241). In this case, battery power measurement processor 210 may not receive electric power from the battery (e.g., main battery 241). Accordingly, battery charge information providing processor 200 may perform a power connection between battery power measurement processor 210 and another battery (e.g., auxiliary battery 242) such that another battery (e.g., auxiliary battery 242) provides electric power to battery power measurement processor 210. In this case, battery charge information providing processor 200 may be required to perform the power connection before or when sending a battery power measurement request to battery power measurement processor 210. When the remaining battery power amount information is received from battery power measurement processor 210, battery charge information providing processor 200 may disconnect the power connection between battery power measurement processor 210 and another battery (e.g., auxiliary battery 242).

At step S408, when receiving the remaining battery power information from battery power measurement processor 210, battery charge information providing processor 200 may determine a battery charge state level and/or a satisfaction of a warning condition, based on the received remaining battery power information. More specifically, battery charge information providing processor 200 may further determine whether a warning condition is satisfied, based on the remaining battery power information. Herein, the warning condition may include at least one of (i) whether the remaining battery power amount is less than a predetermined minimum value (i.e., "a first threshold value"), or (ii) whether a decreasing rate of the remaining battery power amount exceeds a predetermined difference value (i.e., "a second threshold value"). Meanwhile, a determination operation of the battery charge state level will be described in more detail with reference to FIG. 5 and FIG. 8.

At step S410, battery charge information providing processor 200 may create at least one control signal (may be referred to as "battery charge state indication signal") corresponding to the battery charge state level (e.g., level 2 in FIG. 5 and FIG. 7) and/or the satisfaction of a warning condition determined at step S408, and transmit the at least one control signals to one or more light lamps 120 and/or one or more speakers 122. Battery charge information providing processor 200 may control at least one of a lamp light color, a lamp blink pattern, and a sound pattern using the created control signal(s). In the case that one or more light lamps and speakers are employed for expressing a remaining battery power amount and/or a warning state, battery charge information providing processor 200 may create at least one lamp control signal and/or at least one speaker control signal. Particularly, battery charge information providing processor 200 may create warning information (e.g., lamp/speaker control information, or a warning notification message) when the warning condition is satisfied. In this case, battery charge information providing processor 200 may control one or more light lamps and/or one or more speakers according to the lamp/speaker control information (or lamp/speaker control signal(s)). Herein, the lamp/speaker control information associated with a warning state notification may be control signals corresponding to one (e.g., Level 4) of a plurality of levels shown in FIG. 5 and FIG. 7. Alternatively, the lamp/speaker control information associated with the warning state notification may be control signals different from control signals shown in FIG. 5 and/or FIG. 7. In other embodiments, when the warning condition is satisfied, battery charge information providing processor 200 may periodically (e.g., periodically within a predetermined time limit or within a predetermined number of times) transmit the at least control signals to one or more light lamps 120 and/or one or more speakers 122. Alternatively, battery charge information providing processor 200 may transmit the at least control signals to one or more light lamps 120 and/or one or more speakers 122 whenever an electric vehicle user having wireless key device 10 comes to within a predetermined distance from electric vehicle 12.

Meanwhile, in other embodiments, battery charge information providing processor 200 may create warning information (e.g., a warning notification message) when the warning condition is satisfied, and transmit the created warning information to at least one of wireless key device 10 and user equipment. In summary, battery charge information providing processor 200 may transmit battery charge state level information and/or warning information to wireless key device 10 and/or user equipment.

At step S412, one or more light lamps 120 and/or one or more speakers 122 may provide (or create) light signals and/or sound signals according to the control signal(s) received from battery charge information providing processor 200. Accordingly, a corresponding user may check the status or the remaining power amount of the battery away from the electric vehicle (e.g., 12) through hearing and/or vision.

Figure 5:
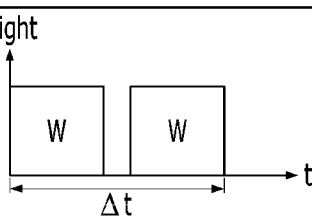
FIG. 5 illustrates lamp control signals determined based on a remaining battery power amount in accordance with at least one embodiment.
Figure 5:
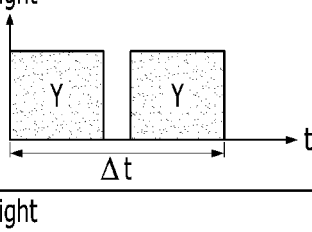
Figure 5:
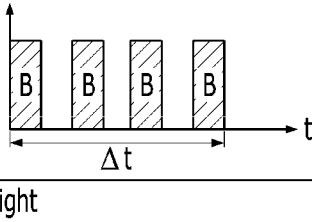
Figure 5:
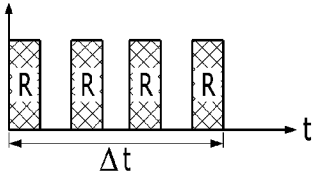

FIG. 5 illustrates lamp control signals determined based on a remaining battery power amount in accordance with at least one embodiment.

As shown in FIG. 5, battery charge state levels may be classified into four levels according to a remaining battery power amount. For example, a remaining battery power amount being within a range of about 80% to 100% of a battery capacity (i.e., 80%≤remaining battery power amount) may correspond to "Level 1". A remaining battery power amount being within a range of about 50% to 80% of a battery capacity (i.e., 50%≤remaining battery power amount<80%) may correspond to "Level 2". A remaining battery power amount being within a range of about 20% to 50% of a battery capacity (i.e., 20%≤remaining battery power amount<50%) may correspond to "Level 3". A remaining battery power amount being under about 20% of a battery capacity (i.e., remaining battery power amount<20%) may correspond to "Level 4".

Battery charge state providing apparatus 20 may control one or more light lamps (e.g., 120a through 120g) of an electric vehicle (e.g., 12), using a control signal corresponding to a battery charge state level. For example, in case of Level 1, battery charge state providing apparatus 20 may control one or more light lamps (e.g., 120a through 120g) such that a light color is white ("W") and a long light blink is performed two times for a determined time period (Δt). In case of Level 2, battery charge state providing apparatus 20 may control one or more light lamps (e.g., 120a through 120g) such that a light color is yellow ("Y") and a long light blink is performed two times for a determined time period (Δt). In case of Level 3, battery charge state providing apparatus 20 may control one or more light lamps (e.g., 120a through 120g) such that a light color is blue ("B") and a short light blink is performed four times for a determined time period (Δt). In case of Level 4, battery charge state providing apparatus 20 may control one or more light lamps (e.g., 120a through 120g) such that a light color is red ("R") and a short blink is performed four times for a determined time period (Δt).

As described above, battery charge state providing apparatus 20 may control both light colors and blink patterns according to battery charge state levels. However, in other embodiments, battery charge state providing apparatus 20 may control only light colors according to battery charge state levels. Alternatively, battery charge state providing apparatus 20 may control only blink patterns (or blink periods) colors according to battery charge state levels. Alternatively, with respect to blink patterns, battery charge state providing apparatus 20 may use one of (i) only long light blinks, (ii) only short light blinks, and (ii) a combination of long light blinks and short light blinks. In other words, a light blink pattern may be associated with a blink period and/or a light duration time. Herein, the blink period and the light duration time may be constant or variable.

Figure 6:
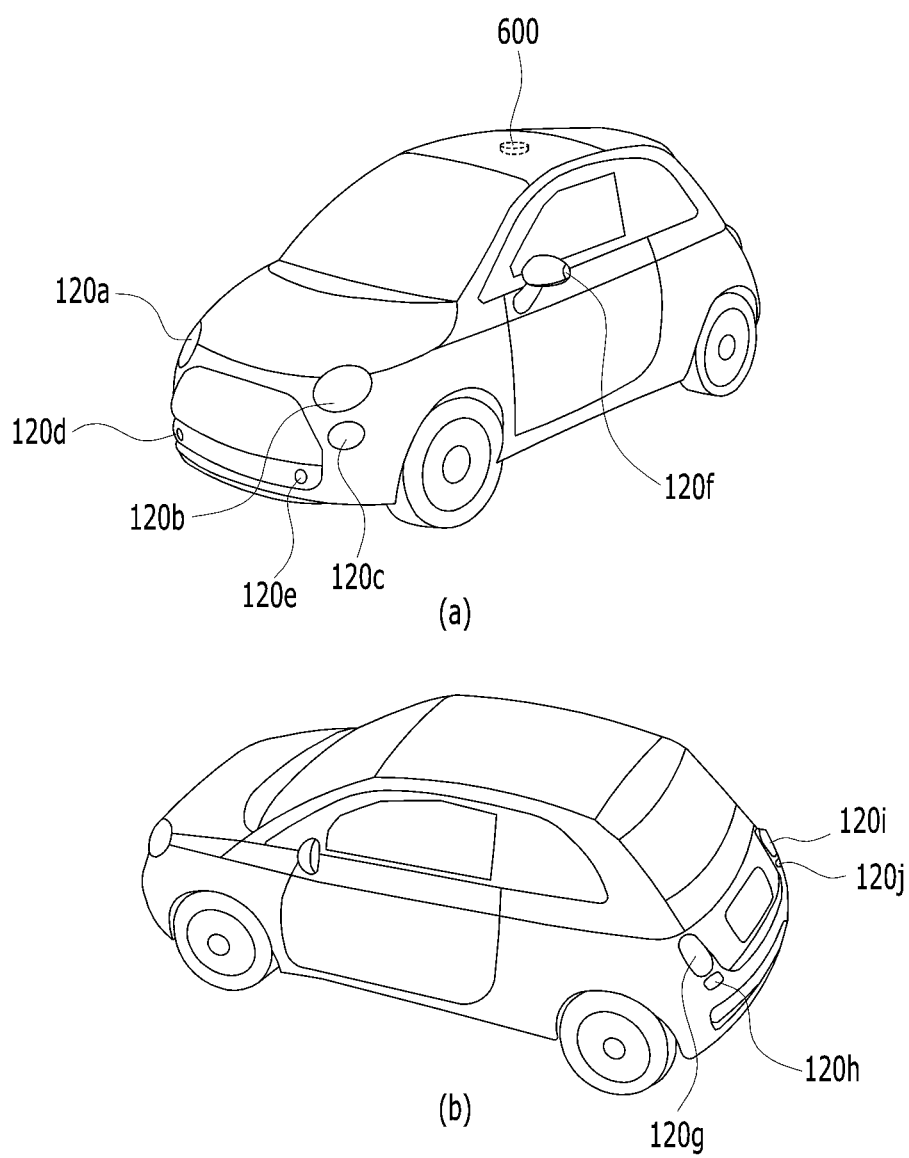
FIG. 6 illustrates an example of providing battery charge state information through one or more existing light lamps installed in an electric vehicle in accordance with at least one embodiment.

FIG. 6 illustrates an example of providing battery charge state information through one or more existing light lamps installed in an electric vehicle in accordance with at least one embodiment.

In the present embodiment, one or more light lamps to be employed for providing remaining battery power information may be additionally installed in a corresponding electric vehicle.

However, as shown in FIG. 6, battery charge state providing apparatus 20 according to the present embodiment may use one or more exiting light lamps which are already installed in an electric vehicle. As shown in FIGS. 6(*a*) and (*b*), an electric vehicle (e.g., 12) may have one or more existing light lamps installed at the interior and/or exterior of the electric vehicle (e.g., 12). For example, the one or more light lamps may include one or more head light lamps (e.g., 120a, 120b), one or more front blinker lamps (e.g., 120c), one or more fog lamps (e.g., 120d, 120e), one or more side blinker lamps (e.g., 120f), one or more tail light lamps (e.g., 120g, 120h, 120i, 120j), one or more room lamps (e.g., 600), and so forth.

FIG. 7 illustrates speaker control signals determined based on a remaining battery power amount in accordance with at least one embodiment.

As described above, the present embodiment may provide remaining battery power information through one or more speakers (e.g., a horn speaker, an anti-theft alarm speaker, a speaker additionally installed for the present embodiment, etc.) installed in an electric vehicle (e.g., 12).

As shown in FIG. 7, battery charge state levels may be classified into four levels according to a remaining battery power amount. For example, a remaining battery power amount being within a range of about 80% to 100% of a battery capacity (i.e., 80%≤remaining battery power amount) may correspond to "Level 1". A remaining battery power amount being within a range of about 50% to 80% of a battery capacity (i.e., 50%≤remaining battery power amount<80%) may correspond to "Level 2". A remaining battery power amount being within a range of about 20% to 50% of a battery capacity (i.e., 20%≤remaining battery power amount<50%) may correspond to "Level 3". A remaining battery power amount being under about 20% of a battery capacity (i.e., remaining battery power amount<20%) may correspond to "Level 4". In other embodiments, a level classification (e.g., three levels or six levels) associated with a speaker control may be different from a level classification (e.g., four levels) associated with a lamp control.

Battery charge state providing apparatus 20 according to the present embodiment may create a speaker control signal for each battery charge state level such that battery charge state levels can be identified (or differently recognized) through different sound patterns.

Battery charge state providing apparatus 20 may control one or more speakers (e.g., 122) of an electric vehicle (e.g., 12), using a control signal corresponding to a battery charge state level. For example, in case of Level 1, battery charge state providing apparatus 20 may control one or more speakers such that a short sound is made twice for a determined time period (Δt). In case of Level 2, battery charge state providing apparatus 20 may control one or more speakers such that a short sound is made four times for a determined time period (Δt). In case of Level 3, battery charge state providing apparatus 20 may control one or more speakers such that a long sound is made once and a short sound is made once for a determined time period (Δt). In case of Level 4, battery charge state providing apparatus 20 may control one or more speakers such that a long sound is made twice for a determined time period (Δt).

With respect to sound patterns, battery charge state providing apparatus 20 may use one of (i) only long sounds, (ii) only short sounds, and (ii) a combination of long sounds and short sounds. In other words, a sound pattern may be associated with a sound period and/or a sound duration time. Herein, the sound period and the sound duration time may be constant or variable.

Meanwhile, speaker control signals for each battery charge state level may correspond to the same frequency band or different frequency bands. Alternatively, voice speech (recorded or synthesized) may be employed for providing information on a battery charge state level and/or a remaining battery power amount.

Furthermore, in case of all or parts of battery charge state levels, lamp control signals shown in FIG. 5 and speaker control signals shown in FIG. 7 may be simultaneously employed for providing information on a battery charge state level (e.g., a remaining battery power amount). In other words, one of (i) a lamp control signal, (ii) a speaker control signal, and (iii) a combination thereof (e.g., a simultaneous use of the lamp control signal and the speaker control signal) may be selectively employed according to battery charge state levels. For example, in the case that a remaining battery power amount is Level 4, a lamp control signal and a speaker control signal may be simultaneously employed. However, in the case that a remaining battery power amount is Level 1, one of a lamp control signal and a speaker control signal may be employed.

Figure 8:
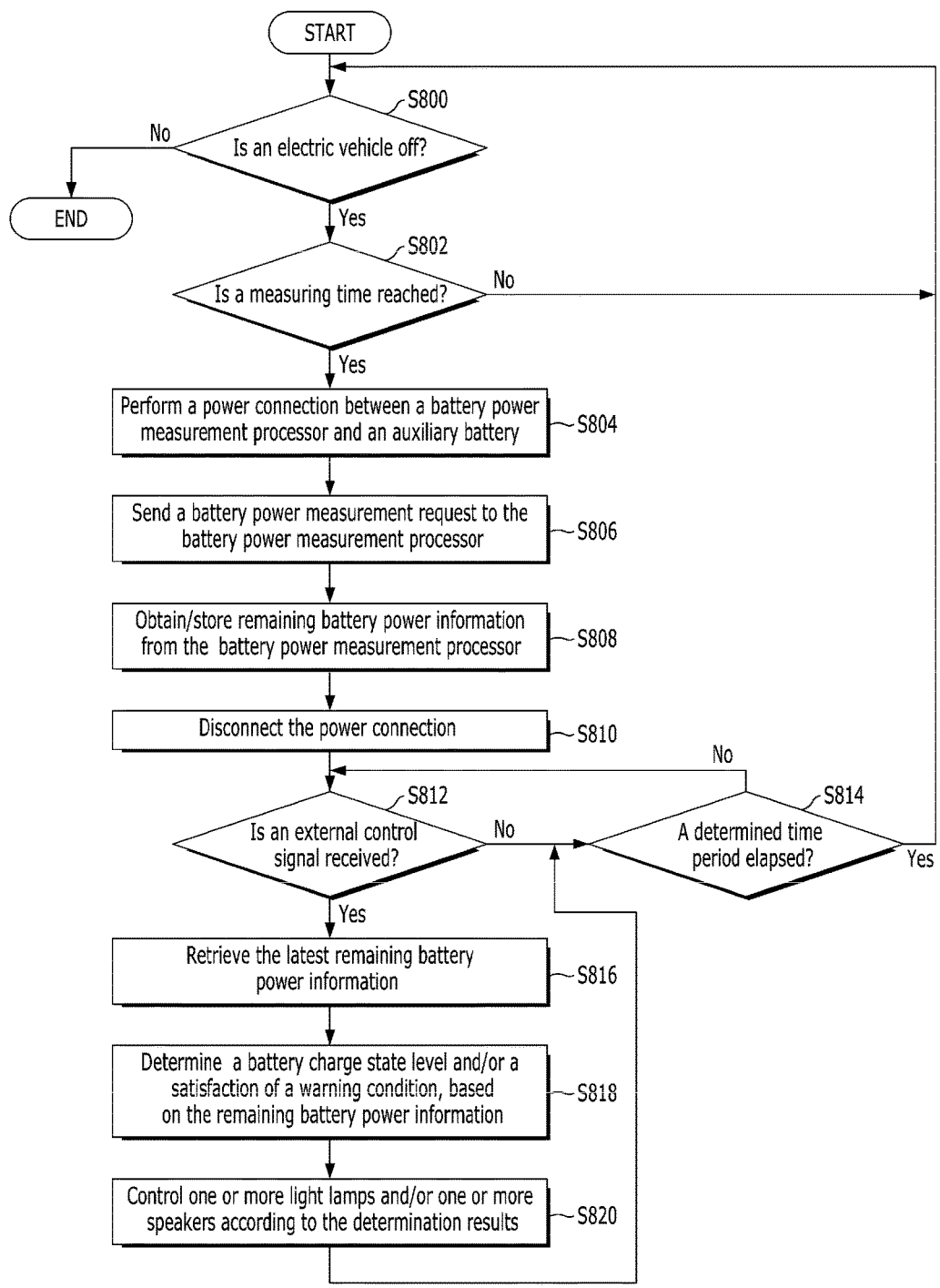
FIG. 8 illustrates another method of providing battery charge state information of an electric vehicle in the case that a measurement procedure of a remaining battery power is periodically performed, in accordance with at least one embodiment.

FIG. 8 illustrates another method of providing battery charge state information of an electric vehicle in the case that a measurement procedure of a remaining battery power is periodically performed, in accordance with at least one embodiment.

As described in FIG. 4, a procedure of obtaining a remaining battery power amount may be performed whenever battery charge state providing apparatus 20 receives an external control signal from a remote control device (e.g., wireless key device 10). In other embodiments, as shown in FIG. 8, a procedure of obtaining a remaining battery power amount may be periodically performed.

In the case that an electric vehicle (e.g., 12) is parked and in a power-off state (i.e., an operation-off state), an electric power of main battery 241 may not be supplied to the electric vehicle. In this case, auxiliary battery 242 may supply an electric power to one or more constituent elements (e.g., battery charge information providing processor 200).

Referring to FIG. 8, at step S800, battery charge information providing processor 200 may monitor whether electric vehicle 12 is in a power-off state (e.g., whether an electric motor of electric vehicle 12 is off). Herein, the electric motor of electric vehicle 12 may correspond to an engine of a typical engine vehicle. Generally, when the electric motor of electric vehicle 12 is on (No-S800), a procedure shown in FIG. 8 may not be applied. However, in other embodiments, in the case that an electric motor of a parked electric vehicle remotely starts by an external control signal (e.g., a start control signal) transmitted from wireless key device 10, a procedure shown in FIG. 8 may be applied.

When the electric motor of electric vehicle 12 is off (Yes-S800), battery charge state providing apparatus 20 may periodically measure a remaining battery power amount of electric vehicle 12. More specifically, at step S802, battery charge information providing processor 200 of battery charge state providing apparatus 20 may determine whether a measuring time threshold is reached.

When the measuring time threshold is reached (Yes-S802), battery charge information providing processor 200 may initiate a procedure (S804 through S810) of obtaining a remaining battery power amount. More specifically, at step S804, battery charge information providing processor 200 may perform a power connection between battery power measurement processor 210 and auxiliary battery 242. In other words, battery charge information providing processor 200 may perform the power connection such that auxiliary battery 242 provides electric power to battery power measurement processor 210. Herein, the power connection may be performed through a switching operation of battery charge information providing processor 200. Meanwhile, when the measuring time threshold is not reached (No-S802), battery charge information providing processor 200) may return to operation S800.

At step S806, battery charge information providing processor 200 may send a battery power measurement request (i.e., a request for measuring a remaining battery power amount) to battery power measurement processor 210. When receiving the battery power measurement request from battery charge information providing processor 200, battery power measurement processor 210 may measure a remaining battery power amount (e.g., a remaining battery power amount of main battery 241) of electric vehicle 12. Battery power measurement processor 210 may provide measurement results to battery charge information providing processor 200.

At step S808, battery charge information providing processor 200 may receive the measurement results (e.g., information on a remaining battery power amount) from battery power measurement processor 210, and store the received measurement results.

At step S810, battery charge information providing processor 200 may disconnect the power connection established at step S804.

At step S812, battery charge information providing processor 200 may monitor whether an external control signal is received from wireless key device 10.

At step S814, when the external control signal is not received, battery charge information providing processor 200 may further determine whether a predetermined measuring time period ("T") has lapsed. If the predetermined measuring time period ("T") has not lapsed, battery charge information providing processor 200 may perform operation S812 again. Such operation (S812) of monitoring the external control signal may be performed until the measuring period ends (Yes-S814). In other words, when a next measuring time is reached, battery charge information providing processor 200 may return to operation S800.

At step S816, when the external control signal is received from wireless key device 10 (Yes-S812), battery charge information providing processor 200 may retrieve the latest information among the remaining battery power information stored at step S808.

At step S818, battery charge information providing processor 200 may determine a battery charge state level and/or a satisfaction of a warning condition, based on the retrieved remaining battery power information. Herein, the warning condition may be at least one of (i) whether the remaining battery power amount is less than a predetermined minimum value ("a first threshold value"), or (ii) whether a decreasing rate of the remaining battery power amount exceeds a predetermined difference value ("second threshold value").

At step S820, battery charge information providing processor 200 may control one or more light lamps and/or one or more speakers of electric vehicle 12, according to determination results (e.g., a battery charge state level, or whether the warning condition is satisfied). In other embodiments, battery charge information providing processor 200 may transmit battery charge state level information and/or warning information to wireless key device 10 and/or user equipment. After performing operation S820, battery charge information providing processor 200 may return to operation S814.

In other embodiments, when receiving the measurement results (e.g., information on a remaining battery power amount) from battery power measurement processor 210 at step S808, battery charge information providing processor 200 may determine whether a warning condition is satisfied. When the warning condition is satisfied, battery charge information providing processor 200 may control one or more light lamps and/or one or more speakers of electric vehicle 12, regardless of reception (S812) of an external control signal. Alternatively, although an external control signal is not received, battery charge information providing processor 200 may control one or more light lamps and/or one or more speakers of electric vehicle 12 when an electric vehicle user having wireless key device 10 comes to within a predetermined distance from electric vehicle 12. When the warning condition is satisfied, battery charge information providing processor 200 may periodically (e.g., periodically within a predetermined time limit or within a predetermined number of times) control one or more light lamps and/or one or more speakers of electric vehicle 12. Furthermore, battery charge information providing processor 200 may transmit warning information to wireless key device 10 and/or user equipment.

Figure 9:
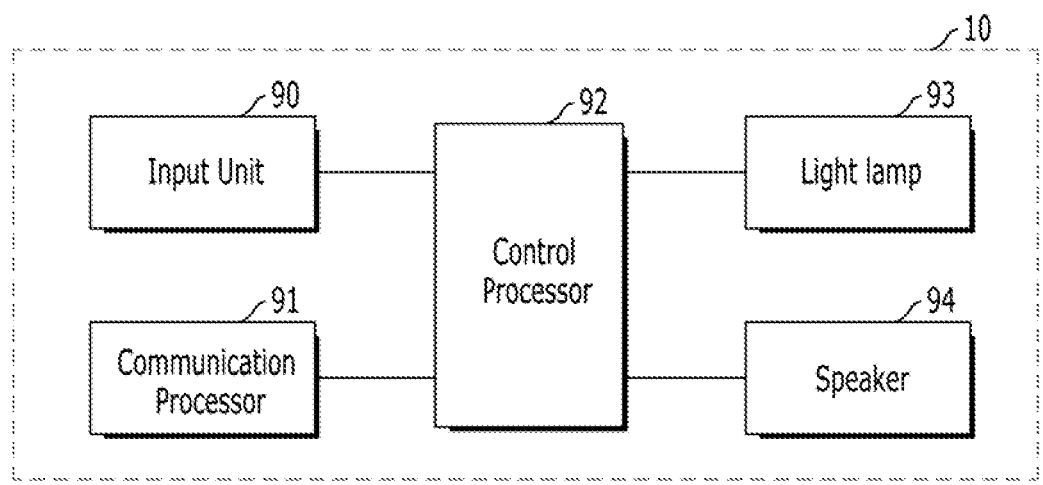
FIG. 9 is a block diagram illustrating a wireless key device in accordance with at least one embodiment.

FIG. 9 is a block diagram illustrating a wireless key device in accordance with at least one embodiment.

As shown in FIG. 9, wireless key device 10 may include input unit 90, communication processor 91, control processor 92, one or more light lamps 93, and one or more speakers 94. Herein, the one or more light lamps 93 and the one or more speakers 94 may be referred to as "an output unit."

Referring to FIG. 9, input unit 90 may receive a user input from an electric vehicle user. Herein, the user input may be an input for requesting an operation control (e.g., a door control, a battery check, a trunk control, etc.) of an electric vehicle (e.g., 12).

Communication processor 91 may transmit or receive signals, messages, information, and/or data required for performing the present embodiment, in connection with battery charge state providing apparatus 20 of an electric vehicle (e.g., 12). More specifically, communication processor 91 may transmit a wireless control signal (or may be referred to as "an external control signal") to an electric vehicle (e.g., 12), and receive battery charge state level information and/or warning information (e.g., a warning notification message) from the electric vehicle (more specifically, battery charge state providing apparatus 20). Herein, the wireless control signal may be a control signal associated with the electric vehicle. For example, the wireless control signal may include a door control signal, a battery check signal, a trunk control signal, a start control signal, a vehicle location check signal, and so forth.

Control processor 92 may control operations of wireless key device 10. More specifically, control processor 92 may control communication processor 91 to transmit the wireless control signal according to the user input. Furthermore, control processor 92 may control at least one of the one or more light lamps 93 and the one or more speakers 94, according to the received battery charge state level information and/or the received warning information. In other words, control processor 92 may control at least one of a lamp light color, a lamp blink pattern, and a sound pattern according to the received battery charge state level information and/or the received warning information. In other embodiments, in the case that wireless key device 10 includes a display screen, control processor 92 may display the battery charge state level information and/or the received warning information, through the display screen.

The one or more light lamps 93 may be lamps of various types. For example, the one or more light lamps may include light bulb (incandescent) lamps, light-emitting diode (LED) lamps, organic light emitting diode (OLED) lamps, and so forth.

As described above, the present embodiment may provide remaining battery power information of an electric vehicle through sound (i.e., audible signals) and/or status indicator lights such that the remaining battery power information is verified even away from the parked electric vehicle.

According to the present embodiment, users may check the status (e.g., a warning state) or the remaining power amount of a corresponding battery away from an electric vehicle through hearing and vision. Particularly, users may identify the status or the remaining power amount of the battery away from the electric vehicle through at least one of various sound signals, indicator light patterns, and indicator light colors.

Furthermore, according to the present embodiment, even when users do not have the visual of an electric vehicle, users may still check the status or the remaining power amount of a corresponding battery through audible signals, such as from a high apartment building or from the inside of a house.

Furthermore, the present embodiment may provide a variety of warning signs regarding the status or the remaining power amount of a corresponding battery or any other problems related to an electric vehicle, and thereby enabling users to conveniently and efficiently manage their electric vehicles.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing battery charge state information of an electric vehicle, the method comprising:
retrieving latest information among remaining battery power amount information at a predetermined period, when an external control signal for the electric vehicle is received;
determining a battery charge state of the electric vehicle, based on the retrieved latest remaining battery power amount information;
determining whether a warning condition is satisfied, based on the remaining battery power amount information; and
providing the battery charge state information by controlling at least one output device of the electric vehicle when the warning condition is satisfied.

2. The method of claim 1, wherein the obtaining of the remaining battery power amount information includes:
performing a power connection between a battery power measurement processor and an auxiliary battery;
sending a battery power measurement request to the battery power measurement processor;
receiving a measurement result of the remaining battery power amount from the battery power measurement processor; and
disconnecting the power connection when the measurement result is received.

3. The method of claim 1, wherein the determining includes:
determining a battery charge state level based on the retrieved latest remaining battery power amount information.

4. The method of claim 3, wherein the at least one output device includes at least one of (i) one or more light lamps, and (ii) one or more speakers.

5. The method of claim 4, wherein the providing the battery charge state information includes:
providing the battery charge state information by controlling at least one of a lamp light color, a lamp blink pattern, and a sound pattern according to the determined battery charge state level.

6. The method of claim 3, further comprising:
transmitting information on the battery charge state level to a corresponding remote control device.

7. The method of claim 1, wherein the electric vehicle is in a power-off state.

8. The method of claim 1, wherein the external control signal is at least one of a door control signal, a battery check signal, a trunk control signal, a start control signal, and a vehicle location check signal.

9. The method of claim 1, wherein the external control signal is generated by a remote control device, wherein the remote control device is one of (i) a wireless key device and (ii) user equipment having a remote control function for the electric vehicle.

10. A method of providing battery charge state information of an electric vehicle, the method comprising:
obtaining information on a remaining battery power amount of the electric vehicle;
determining whether a warning condition is satisfied, based on the information on the remaining battery power amount; and
providing warning information by controlling at least one output device of the electric vehicle when the warning condition is satisfied,
wherein the warning condition includes at least one of (i) whether the remaining battery power amount is less than a first threshold value, and (ii) whether a decreasing rate of the remaining battery power amount exceeds a second threshold value.

11. The method of claim 10, wherein the providing the warning information includes:
monitoring whether a remote control device is within a predetermined distance from the electric vehicle, when the warning condition is satisfied; and
providing the warning information by controlling the at least one output device of the electric vehicle when the remote control device is within the predetermined distance.

12. The method of claim 11, wherein:
the remote control device is one of (i) a wireless key device, and (ii) user equipment having a remote control function for the electric vehicle;
the at least one output device includes at least one of (i) one or more light lamps, and (ii) one or more speakers; and
the providing the warning information includes providing the battery charge state information by controlling at least one of a lamp light color, a lamp blink pattern, and a sound pattern.

13. The method of claim 10, further comprising:
transmitting a warning notification to a corresponding remote control device when the warning condition is satisfied.

14. A method of providing battery charge state information of an electric vehicle, the method comprising:
obtaining information on a remaining battery power amount of the electric vehicle;
determining whether a battery charge state notification condition is satisfied, based on the information on the remaining battery power amount;
monitoring whether a remote control device is within a predetermined distance from the electric vehicle, when the battery charge state notification condition is satisfied; and
providing the battery charge state information by controlling at least one output device of the electric vehicle, when the remote control device is within the predetermined distance.

15. The method of claim 14, wherein the battery charge state notification condition includes at least one of (i) whether the remaining battery power amount is less than a first threshold value, and (ii) whether a decreasing rate of the remaining battery power amount exceeds a second threshold value.

16. The method of claim 14, wherein:
the at least one output device includes at least one of (i) one or more light lamps and (ii) one or more speakers; and
the providing the battery charge state information includes providing the battery charge state information by controlling at least one of a lamp light color, a lamp blink pattern, and a sound pattern.

17. An apparatus for providing battery charge state information of an electric vehicle, the apparatus comprising:
a battery power measurement processor configured to measure a remaining battery power amount of the electric vehicle; and
a battery charge information providing processor configured to:
(i) determine whether a battery charge state notification condition is satisfied, based on the remaining battery power amount,
(ii) monitor whether a remote control device is within a predetermined distance from the electric vehicle, when the battery charge state notification condition is satisfied, and
(iii) provide the battery charge state information by controlling at least one output device of the electric vehicle when the remote control device is within the predetermined distance.

18. The apparatus of claim 17, wherein the battery charge state notification condition includes at least one of (i) whether the remaining battery power amount is less than a first threshold value, and (ii) whether a decreasing rate of the remaining battery power amount exceeds a second threshold value.

19. The apparatus of claim 17, wherein:
the remote control device is one of (i) a wireless key device, and (ii) user equipment having a remote control function for the electric vehicle;
the at least one output device includes at least one of (i) one or more light lamps, and (ii) one or more speakers; and
the battery charge information providing processor is configured to provide the battery charge state information by controlling at least one of a lamp light color, a lamp blink pattern, and a sound pattern.

20. The apparatus of claim 17, wherein the battery charge information providing processor is configured to:
transmit the battery charge state information to a corresponding remote control device when the battery charge state notification condition is satisfied.

* * * * *